July 11, 1950 J. E. FERNLY 2,515,035
COOKING DEVICE
Filed July 24, 1946 4 Sheets-Sheet 1

Inventor:
Joseph E. Fernly.
Attorney.

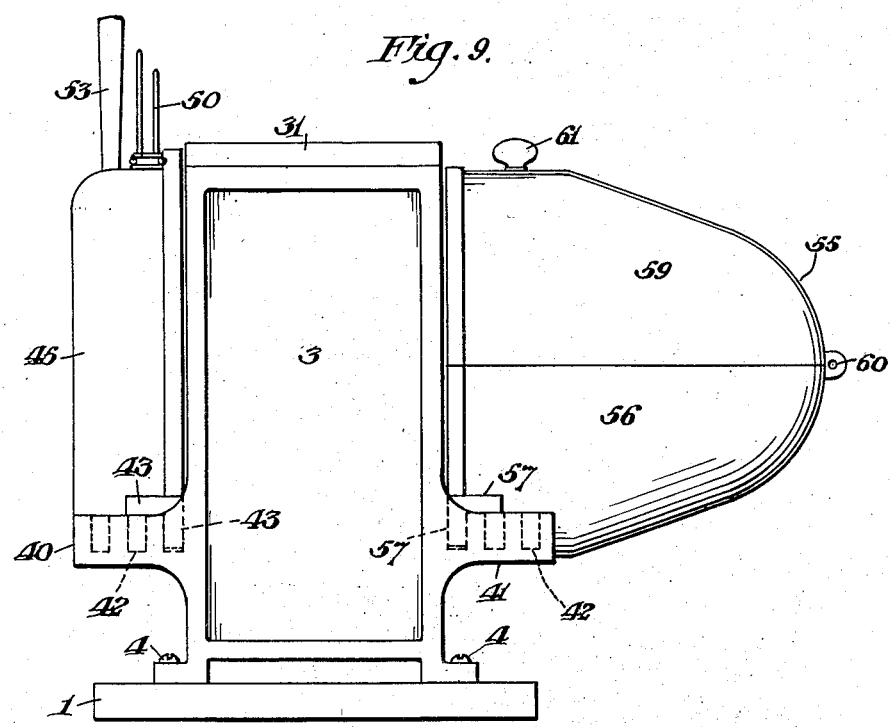
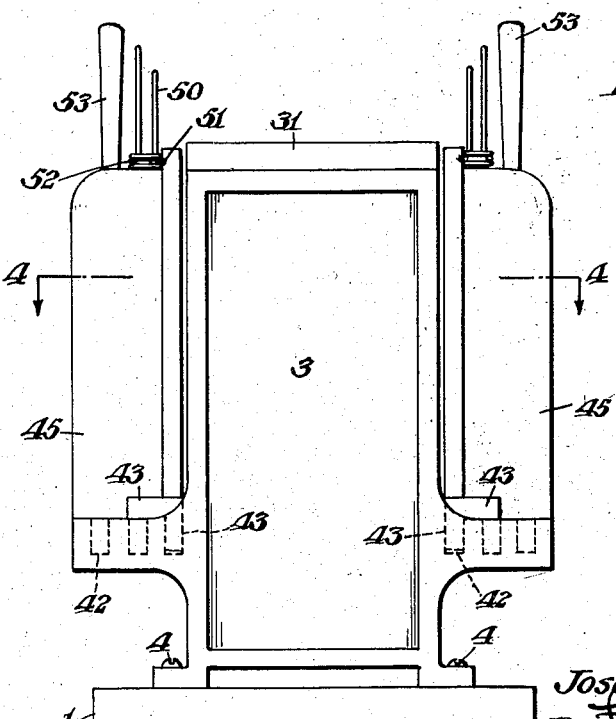

Inventor:
Joseph E. Fernly,
By James E. Paige
Attorney.

Inventor:
Joseph E. Fernly,

Patented July 11, 1950

2,515,035

UNITED STATES PATENT OFFICE 2,515,035

COOKING DEVICE

Joseph E. Fernly, Muskegon Heights, Mich.

Application July 24, 1946, Serial No. 686,012

2 Claims. (Cl. 126—25)

My invention relates to cooking devices which are particularly adaptable for use in the broiling of foods, such as steaks and the like. The form of my invention which I have chosen for illustration herein is particularly adapted for use with charcoal or other solid fuels.

One object of my invention is to provide a cooking device in which the food being broiled is so positioned with respect to the fire in the cooking device that none of the fats or juices from the food drop into the fire.

Another object of my invention is to provide a cooking device in which the food being broiled may be positioned selectively with respect to its proximity to the fire.

Another object of my invention is to provide a cooking device in which the broiling pans may be positioned selectively in either a vertical or horizontal plane.

Another object of my invention is to provide a cooking device in which an oven unit may be interchangeably attached to the cooking device in place of the broiler pan.

Another object of my invention is to provide said oven unit with heat reflecting surfaces of a geometrical design which will cause the heat to be concentrated in the middle of the oven unit where a food grate or shelf may be installed.

Another object of my invention is to provide a cooking device which may be readily assembled from parts which require a minimum of machining operations.

My invention includes the various novel features of construction and arrangement hereinafter more definitely specified.

In the said drawings:

Fig. 3 is an end elevation of the structure shown in Figs. 1 and 2.

Fig. 9 is an end elevation, similar to Fig. 3, but with an oven unit shown in position in the device in lieu of a broiler pan.

Figure 1:
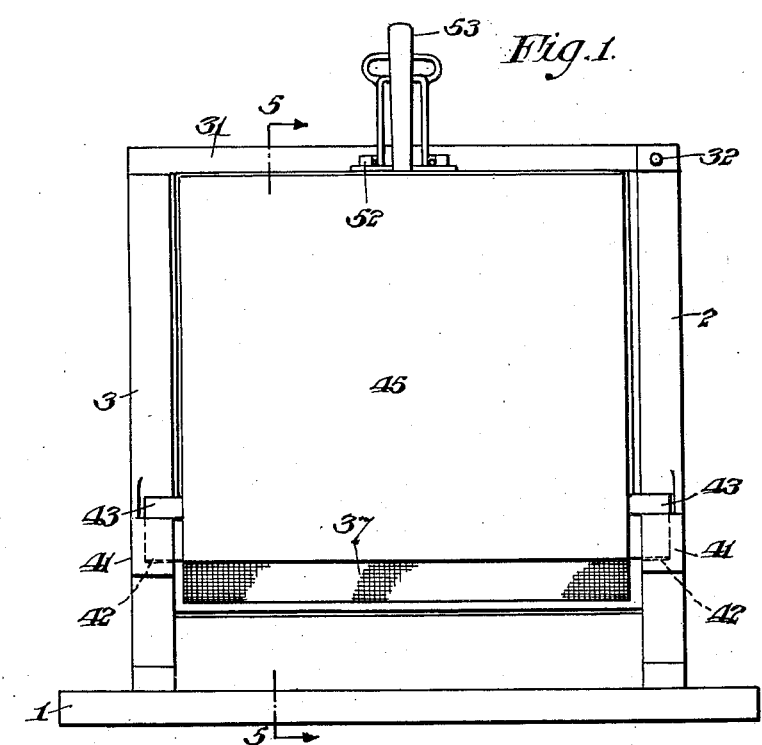
Fig. 1 is a side elevation of my improved cooking device.

Referring to said drawings; my cooking device includes the base member 1 on which end members 2 and 3 are rigidly mounted, conveniently by screws 4 which extend through the base of the end members into screw threaded openings formed in the base member 1. The end members 2 and 3 are identical in construction, except for the hinge lugs hereinafter described on the member 2, and, accordingly, only the member 2 will be described. The members 2 and 3 are mounted on the base member 1 with the recessed faces of said members facing each other. Each end member is provided at its lowermost part with a rectangular opening 6 to minimize the weight of the end member.

Figure 4:
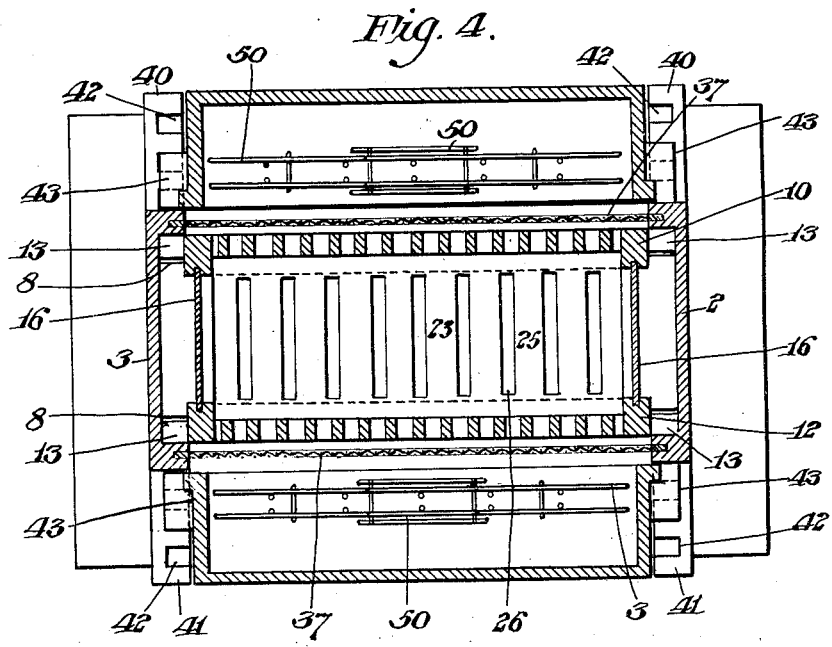
Fig. 4 is a horizontal sectional view, taken on the lines 4—4 in Fig. 3.
Figure 6:
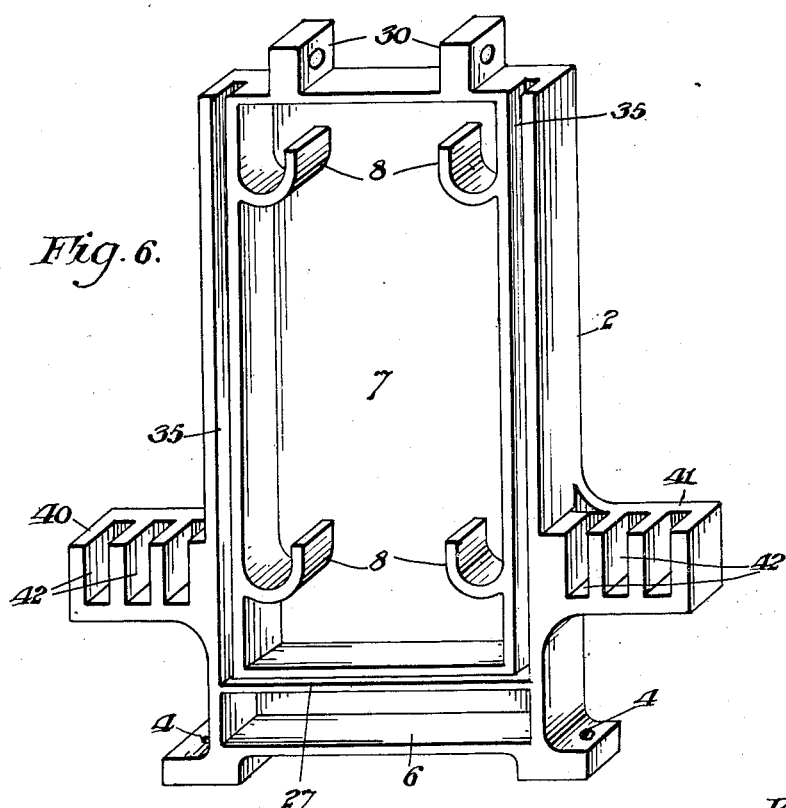
Fig. 6 is a perspective view of one of the end members.

Each end member is provided with a recessed chamber 7, and four grate member hangers 8 of general U-shape are formed in integral relationship with the side walls of said chamber 7, as best shown in Fig. 6. The grate members 10 and 12, identical in construction and positioned in the cooking device in oppositely counterpart position, are provided with square or rectangular lugs 13 at the four corners thereof. The supporting lugs 13 of the grate members 10 and 12 rest in the grate member hangers 8 formed in the end members 2 and 3, as best shown in Fig. 4. It is to be noted that transfer of heat from the grate members 10 and 12 to the members 2 and 3 is minimized by having the lugs 13 of a square or rectangular configuration and supported in U-shaped hangers 8.

Figure 5:
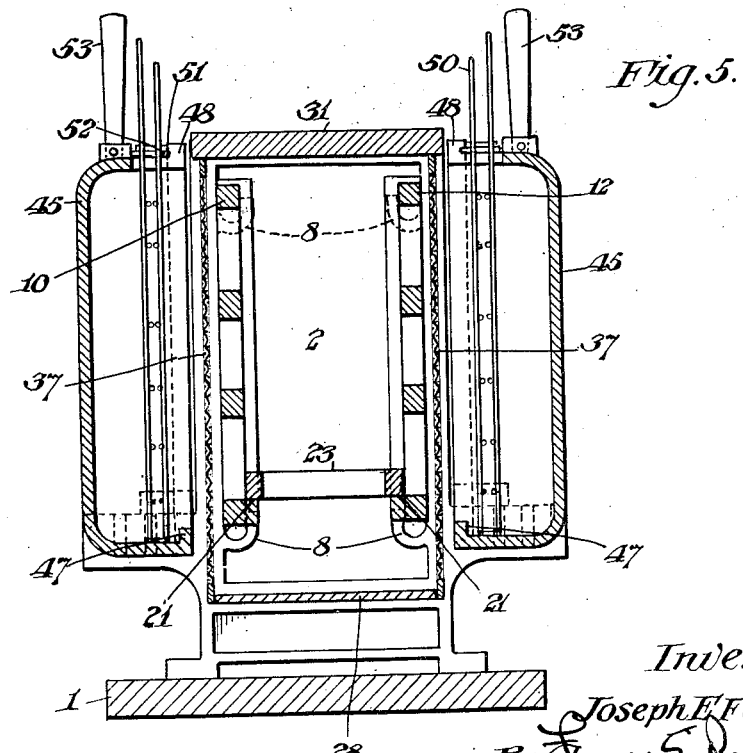
Fig. 5 is a vertical sectional view, taken on the lines 5—5 in Figs. 1 and 2.
Figure 7:
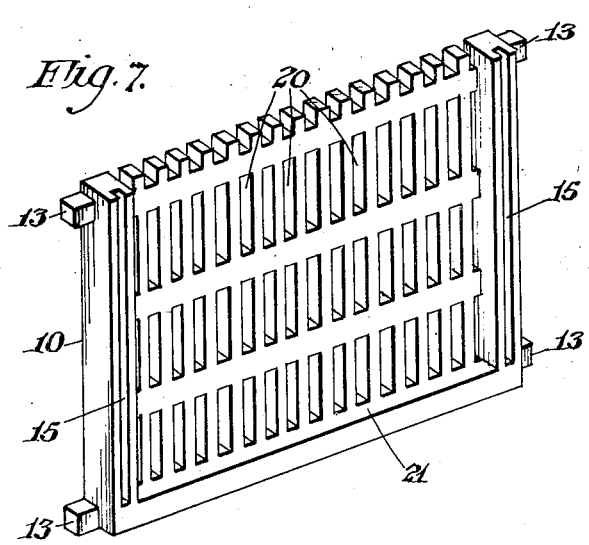
Fig. 7 is a perspective view of one of the grate members.

Each grate member is provided at its opposite ends with a vertical groove 15 adapted to receive and support the side edges of the heat deflector plates 16, as best shown in Fig. 4. The grate members 10 and 12 are formed with a series of spaced apart ribs 20, and each of said grate members 10 and 12 is provided at its lowermost portion with a horizontal ledge 21 which forms the seat for the horizontal bottom grate member 23, as is best shown in Figs. 4, 5 and 7. As best shown in Fig. 4, the grate member 23 is of a well known construction and includes a series of cross members 25 with openings 26 between the cross members 25. The fuel chamber of my cooking device is thus defined by the side grate members 10 and 12, the two opposite end heat deflector plates 16, and the bottom grate member 23. The fuel chamber is adapted to be filled with charcoal or other solid fuel, and ignited to provide the broiling heat.

Each of the end members 2 and 3 is provided with a horizontal groove 27 in which the opposite ends of the heat deflector plate 28 are supported, as best shown in Figs. 5 and 6. The heat deflector plate 28 is merely an imperforate flat plate, supported in the groove openings 27, and said plate 28 also forms an ash pit below the horizontal grate 23.

Figure 2:
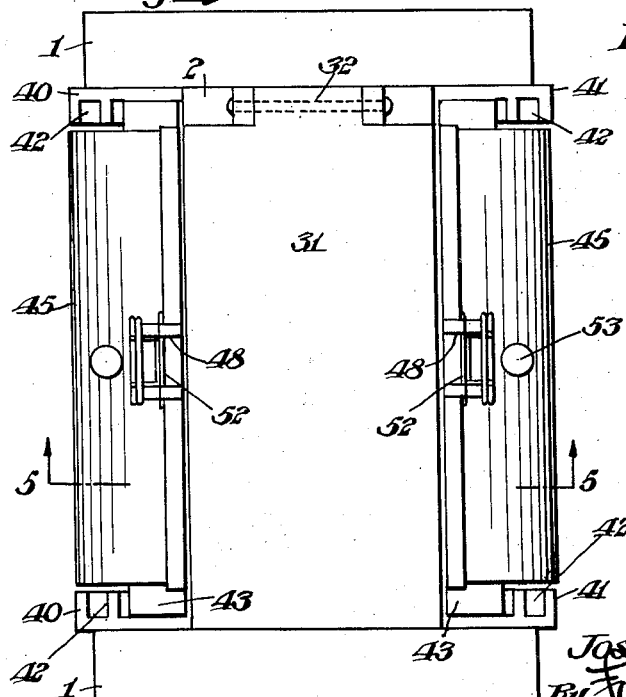
Fig. 2 is a top plan view of the cooking device shown in Fig. 1.

The end member 2 is provided at its top surface with a pair of lugs 30 on which the lid 31 is pivotally mounted by means of a pintle 32, as best shown in Fig. 2. Although I have shown the lid 31 hingedly mounted on the end member 2, it is obvious that the lugs 30 may be omitted from the end member 2 and that the lid may merely rest upon the upper surfaces of the end members 2 and 3.

Each end member is provided, at its opposite sides, with vertical grooves 35 which engage and support the opposite ends of spark screens 37, as indicated in Figs. 4 and 5. Said spark screens 37 may be removed if found to be unnecessary.

Each end member 2 and 3 is provided with a pair of oppositely extending arms 40 and 41, each of which has formed therein a series of slots 42 adapted to receive the right angle supporting lugs 43 formed at the lower end of the broiler pans 45. It is obvious that the broiler pans 45 may be supported in a horizontal plane, instead of a vertical plane as shown, by inserting the upper leg, as shown in Fig. 3, of the right angled supporting lug 43 in the slots 42 when the broiler pan is in a position 90° from that shown in Fig. 3. The lower part of each broiler pan 45 is provided with an upwardly turned lip 47 which forms a well at the bottom of the broiler pan to collect the fats and juices which may flow from the food as it is being broiled.

Figure 8:
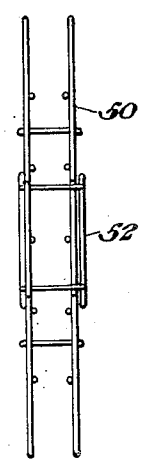
Fig. 8 is a top plan view of the wire food holding unit indicated in Fig. 5.

Notched recesses 48 are formed in the upper ends of the broiler pans 45 to receive the handle of a wire food holding device 50 of well known construction, as best shown in Figs. 4, 5 and 8. As best shown in Fig. 5, the surrounding bead on the broiler pan 45 adjacent the recess 48 is provided with the notch 51 adapted to engage the member 52 of the wire food holding device to hold the food device in position in the broiler pan 45. I also find it convenient to provide each broiler pan with a handle 53 to facilitate the entrance and removal of the broiler pans from the cooking device.

As shown in Fig. 9, an oven unit 55 may be used with my device in lieu of one of the broiler pans. The oven unit 55 comprises the base member 56 which is provided at its lower end with right angle supporting lugs 57 adapted to be inserted in the slots 42, in the same manner as heretofore described for the broiler pan 45. The top cover member 59 is hingedly connected at 60 to the lower member 56, and I find it convenient to provide the top cover member 59 with a handle 61. The oven unit is of such geometric design as will cause the heat to be concentrated in the middle of the oven unit, and it is obvious that said oven unit may readily be provided with a grate or shelf on which the food to be cooked may be placed.

It is obvious that various modifications may be made in my invention without departing from the essential features thereof and, therefore, I do not desire to limit myself to the precise details of construction and arrangement as herein shown and described.

I claim:

1. In a cooking device of the class described; the combination of a horizontal base member; spaced apart oppositely counterpart imperforate vertical end members rigidly attached to said base member; grate member support means in integral relationship with each of said end members; spaced apart vertical grate members supported by said support means; a horizontal grate member supported at the bottom of said vertical grate members; a pair of oppositely extending arms integrally connected to each end member; a series of notched recesses in said oppositely extending arms; broiler pans; means on said broiler pans for supporting said pans selectively in engagement in said notched recesses in said oppositely extending arms on said end members; vertical heat deflector plates; and means at the opposite ends of said vertical grate members arranged to support said heat deflector plates at their side edges; whereby, said pans may be positioned selectively with respect to their proximity to a fire maintained within said grate members and said vertical heat deflector plates.

2. In a cooking device of the class described; the combination of a horizontal base member; spaced apart oppositely counterpart imperforate vertical end members rigidly attached to said base member; a series of U-shaped grate member support brackets in integral relationship with each of said end members; spaced apart vertical grate members; rectangularly shaped support lugs at the corners of said vertical grate members for supporting said vertical grate members in said U-shaped support brackets; a horizontal grate member supported at the bottom of said vertical grate members; a pair of oppositely extending arms integrally connected to each end member; a series of notched recesses in said oppositely extending arms; broiler pans; right angle supporting lugs on said broiler pans for engagingly supporting said pans selectively in a vertical or horizontal plane in said notched recesses in said oppositely extending arms on said end members; vertical heat deflector plates; and means at the opposite ends of said vertical grate members arranged to support said heat deflector plates at their side edges; whereby, said pans may be positioned selectively with respect to their proximity to a fire maintained within said grate members and said vertical heat deflector plates.

JOSEPH E. FERNLY.

REFERENCES CITED

The following references are of record in the file of this patent:

UNITED STATES PATENTS

| Number | Name | Date |
|---|---|---|
| 44,175 | Foote | Sept. 13, 1864 |
| 80,987 | McNiel | Aug. 11, 1868 |
| 339,473 | Richardson | Apr. 6, 1886 |
| 593,098 | Holland | Nov. 2, 1897 |
| 665,091 | Griffith | Jan. 1, 1901 |
| 696,876 | Lydick | Apr. 1, 1902 |
| 698,552 | Pearse | Apr. 29, 1902 |
| 820,847 | Cole | May 15, 1906 |
| 1,156,773 | Gordon | Oct. 12, 1915 |
| 1,656,181 | Elbert | Jan. 17, 1928 |
| 1,871,290 | Wright | Aug. 9, 1932 |
| 2,124,837 | Triolo | July 26, 1938 |
| 2,408,935 | Kunst | Oct. 8, 1946 |